United States Patent
Kagami

(10) Patent No.: US 9,935,326 B2
(45) Date of Patent: Apr. 3, 2018

(54) FUEL CELL SYSTEM

(71) Applicant: NISSAN MOTOR CO., LTD., Yokohama-shi, Kanagawa (JP)

(72) Inventor: Fumio Kagami, Yokohama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 14/416,790

(22) PCT Filed: Jul. 23, 2013

(86) PCT No.: PCT/JP2013/069938
§ 371 (c)(1),
(2) Date: Jan. 23, 2015

(87) PCT Pub. No.: WO2014/017496
PCT Pub. Date: Jan. 30, 2014

(65) Prior Publication Data
US 2015/0188170 A1 Jul. 2, 2015

(30) Foreign Application Priority Data
Jul. 25, 2012 (JP) .................................. 2012-164626

(51) Int. Cl.
*H01M 8/04* (2016.01)
*H01M 8/04858* (2016.01)
(Continued)

(52) U.S. Cl.
CPC ..... *H01M 8/04902* (2013.01); *B60L 11/1887* (2013.01); *H01M 8/0491* (2013.01);
(Continued)

(58) Field of Classification Search
CPC ......... H01M 8/04858; H01M 8/04895; H01M 8/04902; H01M 8/0491; H01M 8/04552;
(Continued)

(56) References Cited

U.S. PATENT DOCUMENTS 7,939,213 B2    5/2011  Ishikawa et al.
2002/0180448 A1* 12/2002  Imamura .............. G01N 27/048
                                                           324/439
(Continued)

FOREIGN PATENT DOCUMENTS

JP      2004-172028 A    6/2004
JP      2005-071797 A    3/2005
(Continued)

*Primary Examiner* — Lisa S Park
(74) *Attorney, Agent, or Firm* — Foley & Lardner LLP

(57) ABSTRACT

A fuel cell system for generating electric power by supplying an anode gas and a cathode gas to a fuel cell includes: an idle stop unit adapted to stop extraction of a current from the fuel cell in accordance with an operation state of the fuel cell system; and an idle stop recovery unit adapted to restart the extraction of the current from the fuel cell in accordance with the operation state of the fuel cell system. The idle stop recovery unit limits, on the basis of an output voltage of the fuel cell before recovery from idle stop, the current to be extracted from the fuel cell after the recovery from the idle stop.

11 Claims, 16 Drawing Sheets

(51) Int. Cl.
*H01M 8/04223* (2016.01)
*H01M 8/04537* (2016.01)
*B60L 11/18* (2006.01)

(52) U.S. Cl.
CPC ... *H01M 8/04223* (2013.01); *H01M 8/04552* (2013.01); *H01M 8/04559* (2013.01); *B60L 11/1881* (2013.01); *H01M 2250/20* (2013.01); *Y02T 90/32* (2013.01); *Y02T 90/34* (2013.01)

(58) Field of Classification Search
CPC ......... H01M 8/04223; H01M 8/04559; H01M 2250/20; H01M 8/043; H01M 8/04313; H01M 8/04544; H01M 8/04553; H01M 8/04574; H01M 8/04582; H01M 8/04589; H01M 8/04604; H01M 8/04611; H01M 8/04619; B60L 11/1887; B60L 11/1881; Y02T 90/34; Y02T 90/32
See application file for complete search history.

(56) References Cited

U.S. PATENT DOCUMENTS

| | | | | |
|---|---|---|---|---|
| 2004/0048118 A1* | 3/2004 | Nakaji | ............... | H01M 16/006 429/429 |
| 2004/0144579 A1* | 7/2004 | Hasuka | ................ | B60L 7/10 180/65.31 |
| 2006/0003205 A1 | 1/2006 | Yoshida et al. | | |
| 2006/0093880 A1* | 5/2006 | Igarashi | ............ | H01M 8/04328 429/429 |
| 2006/0257698 A1 | 11/2006 | Ishikawa et al. | | |
| 2007/0166582 A1 | 7/2007 | Okamoto | | |
| 2007/0256872 A1* | 11/2007 | Yamamuro | ............ | A61G 5/045 180/65.51 |
| 2008/0187790 A1* | 8/2008 | Kamihara | ............ | H01M 8/04231 429/429 |
| 2009/0267556 A1* | 10/2009 | Koike | ................ | B60L 11/1881 318/434 |
| 2010/0047630 A1* | 2/2010 | Imanishi | ............ | H01M 8/04268 429/437 |
| 2010/0068574 A1* | 3/2010 | Naganuma | ........ | H01M 8/04089 429/423 |
| 2010/0129692 A1 | 5/2010 | Ueda et al. | | |
| 2011/0143244 A1* | 6/2011 | Hayashi | ............ | H01M 8/04231 429/429 |
| 2012/0143424 A1 | 6/2012 | Koike | | |

FOREIGN PATENT DOCUMENTS

| | | |
|---|---|---|
| JP | 2006-280108 A | 10/2006 |
| JP | 2007-265653 A | 10/2007 |
| JP | 2008-048486 A | 2/2008 |
| JP | 2010-129245 A | 6/2010 |
| JP | 2011-014322 A | 1/2011 |

* cited by examiner

FUEL CELL SYSTEM

TECHNICAL FIELD

The present invention relates to a fuel cell system.

BACKGROUND ART

JP2004-172028A discloses a conventional fuel cell system that maintains an output voltage of a fuel cell stack at a high voltage during idle stop.

However, it was found out that a problem occurs that the output voltage is lowered transitionally at the time of recovery from the idle stop when the output voltage of the fuel cell stack is maintained at the high voltage during the idle stop.

The present invention is made in view of such a problem, and it is an object to suppress the output voltage from being lowered at the time of the recovery from the idle stop.

SUMMARY OF INVENTION

According to an aspect of the present invention, there is provided a fuel cell system for generating electric power by supplying an anode gas and a cathode gas to a fuel cell. The fuel cell system includes: an idle stop unit adapted to stop extraction of a current from the fuel cell in accordance with an operation state of the fuel cell system; and an idle stop recovery unit adapted to restart the extraction of the current from the fuel cell in accordance with the operation state of the fuel cell system. The idle stop recovery unit limits, on the basis of an output voltage of the fuel cell before recovery from idle stop, the current to be extracted from the fuel cell after the recovery from the idle stop.

DESCRIPTION OF EMBODIMENTS

Hereinafter, embodiments of the present invention will be explained with reference to the drawings and the like.

First Embodiment

A fuel cell generates electric power by sandwiching an electrolyte membrane between an anode electrode (fuel electrode) and a cathode electrode (oxidant electrode) and respectively supplying an anode gas (fuel gas) containing hydrogen and a cathode gas (oxidant gas) containing oxygen to the anode electrode and the cathode electrode. Electrode reactions that take place in both of the anode electrode and the cathode electrode are as follows.

$$\text{Anode electrode: } 2H_2 \rightarrow 4H^+ + 4e^- \quad (1)$$

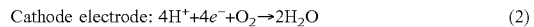

$$\text{Cathode electrode: } 4H^+ + 4e^- + O_2 \rightarrow 2H_2O \quad (2)$$

By means of these electrode reactions of (1) and (2), the fuel cell generates an electromotive force of about one volt.

In a case where such a fuel cell is used as a power source for a vehicle, a large amount of electric power is required. For that reason, hundreds of pieces of the fuel cells are laminated and used as a fuel cell stack. A fuel cell system for supplying the anode gas and the cathode gas to the fuel cell stack is configured, and electric power for driving the vehicle is extracted therefrom.

Figure 1:
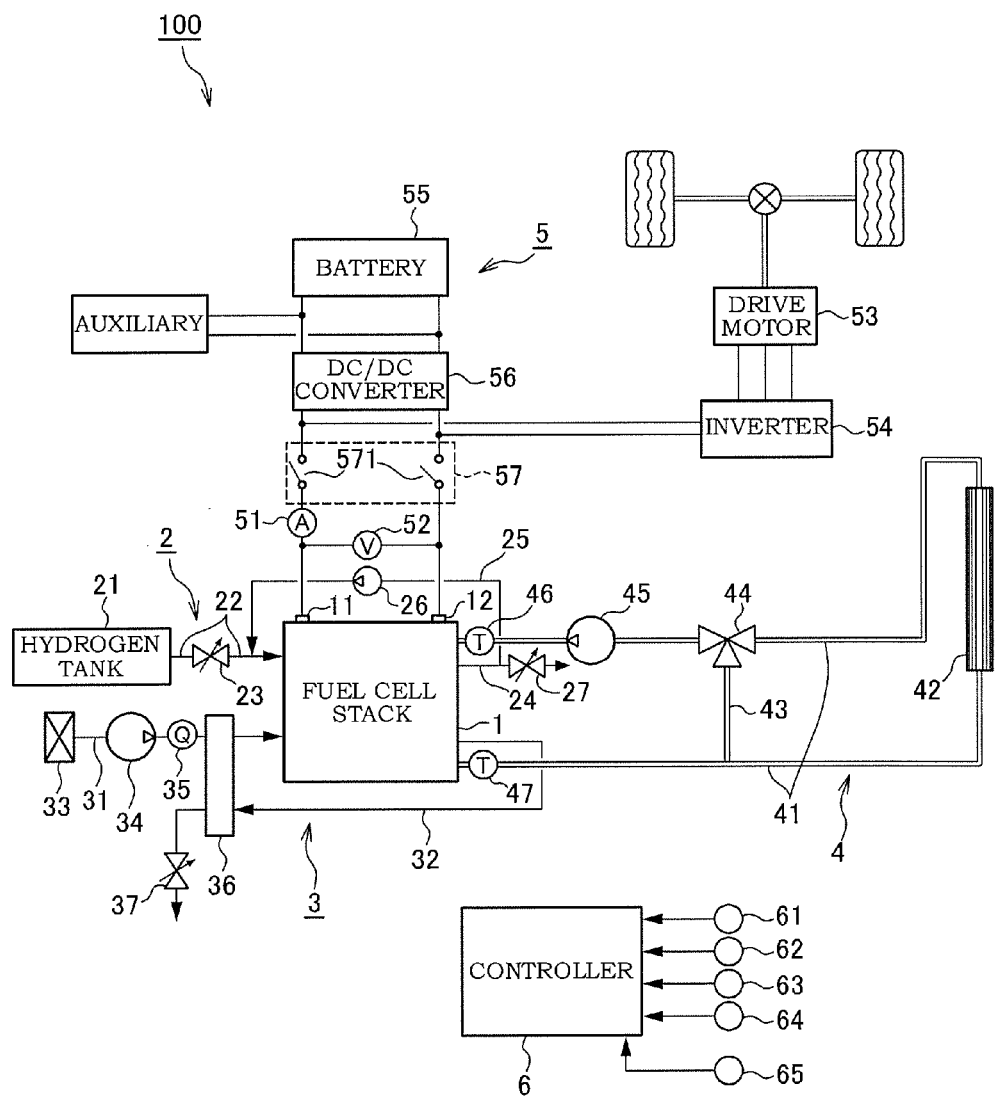
FIG. 1 is a schematic view of a fuel cell system according to a first embodiment of the present invention.

FIG. 1 is a schematic view of a fuel cell system 100 according to the present embodiment.

The fuel cell system 100 is provided with a fuel cell stack 1, an anode gas supplying/discharging device 2, a cathode gas supplying/discharging device 3, a stack cooling device 4, a power system 5, and a controller 6.

The fuel cell stack 1 is configured by laminating hundreds of pieces of the fuel cells, and generates electric power required for driving the vehicle by receiving the supply of the anode gas and the cathode gas. The fuel cell stack 1 is provided with an anode electrode side output terminal 11 and a cathode electrode side output terminal 12 as terminals to extract electric power.

The anode gas supplying/discharging device 2 is provided with a high-pressure tank 21, an anode gas supply passage 22, an anode pressure regulating valve 23, an anode gas discharge passage 24, an anode gas recirculating passage 25, a recycling compressor 26, and a discharging valve 27.

The high-pressure tank 21 stores the anode gas while keeping the anode gas to be supplied to the fuel cell stack 1 in a high pressure state.

The anode gas supply passage 22 is a passage through which the anode gas to be supplied to the fuel cell stack 1 flows. One end thereof is connected to the high-pressure tank 21, and the other end is connected to an anode gas inlet port of the fuel cell stack 1.

The anode pressure regulating valve 23 is provided on the anode gas supply passage 22. Opening/closing of the anode pressure regulating valve 23 is controlled by the controller 6, and the anode pressure regulating valve 23 thereby regulates pressure of the anode gas flowed out from the high-pressure tank 21 to the anode gas supply passage 22 to desired pressure.

The anode gas discharge passage 24 is a passage through which an anode off-gas discharged from the fuel cell stack 1 flows. One end thereof is connected to an anode gas outlet port of the fuel cell stack 1, and the other end is an open end. The anode off-gas is a mixed gas of the excess anode gas that was not used in an electrode reaction and an inert gas that is leaked from the cathode side, such as nitrogen.

The anode gas recirculating passage 25 is a passage for returning the anode off-gas, discharged to the anode gas discharge passage 24, back to the anode gas supply passage 22. One end of the anode gas recirculating passage 25 is connected to the anode gas discharge passage 24 at an upstream side of the discharging valve 27, and the other end is connected to the anode gas supply passage 22 at a downstream side of the anode pressure regulating valve 23.

The recycling compressor 26 is provided on the anode gas recirculating passage 25. The recycling compressor 26 returns the anode off-gas, discharged to the anode gas discharge passage 24, back to the anode gas supply passage 22.

The discharging valve 27 is provided on the anode gas discharge passage 24 at a downstream side of a connecting portion at which the anode gas discharge passage 24 and the anode gas recirculating passage 25 are connected. Opening/closing of the discharging valve 27 is controlled by the controller 6 to discharge the anode off-gas and condensed water to the outside of the fuel cell system 100.

The cathode gas supplying/discharging device 3 is provided with a cathode gas supply passage 31, a cathode gas discharge passage 32, a filter 33, a cathode compressor 34, an air flow sensor 35, a water recovery device (hereinafter, referred to as a "WRD") 36, and a cathode pressure regulating valve 37.

The cathode gas supply passage 31 is a passage through which the cathode gas to be supplied to the fuel cell stack 1 flows. One end of the cathode gas supply passage 31 is connected to the filter 33, and the other end is connected to a cathode gas inlet port of the fuel cell stack 1.

The cathode gas discharge passage 32 is a passage through which a cathode off-gas discharged from the fuel cell stack 1 flows. One end of the cathode gas discharge passage 32 is connected to a cathode gas outlet port of the fuel cell stack 1, and the other end is an open end. The cathode off-gas is a mixed gas of the cathode gas and water vapor that is generated by the electrode reaction.

The filter 33 removes foreign matters in the cathode gas that is taken into the cathode gas supply passage 31.

The cathode compressor 34 is provided on the cathode gas supply passage 31. The cathode compressor 34 takes air (outside air) as the cathode gas into the cathode gas supply passage 31 via the filter 33, and supplies the air to the fuel cell stack 1.

The air flow sensor 35 is provided on the cathode gas supply passage 31 at a downstream side of the cathode compressor 34. The air flow sensor 35 detects a flow rate of the cathode gas flowing through the cathode gas supply passage 31.

The WRD 36 is connected to each of the cathode gas supply passage 31 and the cathode gas discharge passage 32. The WRD 36 collects moisture in the cathode off-gas flowing through the cathode gas discharge passage 32, and uses the collected moisture to humidify the cathode gas flowing through the cathode gas supply passage 31.

The cathode pressure regulating valve 37 is provided on the cathode gas discharge passage 32 at a downstream side of the WRD 36. Opening/closing of the cathode pressure regulating valve 37 is controlled by the controller 6, and the cathode pressure regulating valve 37 regulates pressure of the cathode gas to be supplied to the fuel cell stack 1 to desired pressure.

The stack cooling device 4 is a device that cools the fuel cell stack 1 and keeps temperature of the fuel cell stack 1 being suitable for electric power generation. The stack cooling device 4 is provided with a cooling water circulating passage 41, a radiator 42, a bypass passage 43, a three-way valve 44, a circulation pump 45, an inlet water temperature sensor 46, and an outlet water temperature sensor 47.

The cooling water circulating passage 41 is a passage through which cooling water for cooling the fuel cell stack 1 circulates.

The radiator 42 is provided on the cooling water circulating passage 41. The radiator 42 cools the cooling water discharged from the fuel cell stack 1.

One end of the bypass passage 43 is connected to the cooling water circulating passage 41, and the other end is connected to the three-way valve 44 so that the cooling water is allowed to bypass the radiator 42 to circulate.

The three-way valve 44 is provided on the cooling water circulating passage 41 at a downstream side of the radiator 42. The three-way valve 44 switches between circulation routes of the cooling water in accordance with temperature of the cooling water. More specifically, when the temperature of the cooling water is relatively high, the circulation routes of the cooling water are switched so that the cooling water discharged from the fuel cell stack 1 is supplied to the fuel cell stack 1 again via the radiator 42. On the contrary, when the temperature of the cooling water is relatively low, the circulation routes of the cooling water are switched so that the cooling water discharged from the fuel cell stack 1 flows through the bypass passage 43 without flowing though the radiator 42 to be supplied to the fuel cell stack 1 again.

The circulation pump 45 is provided on the cooling water circulating passage 41 at a downstream side of the three-way valve 44, and allows the cooling water to circulate.

The inlet water temperature sensor 46 is provided on the cooling water circulating passage 41 in the vicinity of a cooling water inlet port of the fuel cell stack 1. The inlet water temperature sensor 46 detects the temperature of the cooling water flowing into the fuel cell stack 1 (hereinafter, referred to as "inlet water temperature").

The outlet water temperature sensor 47 is provided on the cooling water circulating passage 41 in the vicinity of a cooling water outlet port of the fuel cell stack 1. The outlet water temperature sensor 47 detects the temperature of the cooling water discharged from the fuel cell stack 1 (hereinafter, referred to as "outlet water temperature").

The power system 5 is provided with a current sensor 51, a voltage sensor 52, a drive motor 53, an inverter 54, a battery 55, a DC/DC converter 56, and a junction box 57.

The current sensor 51 detects a current extracted from the fuel cell stack 1 (hereinafter, referred to as an "output current").

The voltage sensor 52 detects a voltage between terminals, i.e., a voltage between the anode electrode side output terminal 11 and the cathode electrode side output terminal 12 (hereinafter, referred to as an "output voltage").

The drive motor 53 is a three-phase AC synchronous motor in which a permanent magnet is embedded in a rotor and a stator coil is wound around a stator. The drive motor 53 has a function as an electric motor that rotatively drives by means of supply of electric power from the fuel cell stack 1 and the battery 55, and a function as a power generator that generates an electromotive force between both ends of the stator coil at the time of deceleration of the vehicle during which the rotor is rotated by an external force.

The inverter 54 is configured by a plurality of semiconductor switches such as an IGBT (Insulated Gate Bipolar Transistor), for example. Opening/closing of each of the semiconductor switches in the inverter 54 is controlled by the controller 6, and this allows to convert DC power into AC power or convert AC power into DC power. When the drive motor 53 is allowed to function as the electric motor, the inverter 54 converts composite DC power, obtained by combining generation power of the fuel cell stack 1 and the output power of the battery 55, into three-phase AC power, and supplies the three-phase AC power to the drive motor 53. On the other hand, when the drive motor 53 is allowed to function as the power generator, the inverter 54 converts regenerative power of the drive motor 53 (three-phase AC power) into DC power, and supplies the DC power to the battery 55.

The battery 55 is charged by an excess of the generation power (obtained by multiplying the output current and the output voltage) of the fuel cell stack 1 and the regenerative power of the drive motor 53. The electric power charged in the battery 55 is supplied to auxiliary machines, such as the recycling compressor 26, the cathode compressor 34 and the like, and to the drive motor 53, if necessary.

The DC/DC converter 56 is a bidirectional voltage converter that increases/decreases the output voltage of the fuel cell stack 1. When the DC/DC converter 56 is used to control the output voltage of the fuel cell stack 1, not only the output current of the fuel cell stack 1 but also the generation power of the fuel cell stack 1 are controlled.

The junction box 57 includes a switch 571, opening/closing of which is controlled by the controller 6, therein. When the switch 571 is connected, it is possible to extract not only the output current of the fuel cell stack 1 but also the generation power of the fuel cell stack 1.

The controller 6 is configured by a microcomputer provided with a central processing unit (CPU), a read-only memory (ROM), a random access memory (RAM), and an input/output interface (I/O interface). Signals from various sensors that are required for controlling the fuel cell system 100, such as an accelerator stroke sensor 61 for detecting a depressing amount of an accelerator pedal (hereinafter, referred to as an "accelerator operation amount") in addition to the air flow sensor 35, the inlet water temperature sensor 46, the outlet water temperature sensor 47, the current sensor 51, and the voltage sensor 52 as described above, are inputted into the controller 6.

The controller 6 calculates, on the basis of the detected signals of the various sensors, the electric power required for operating the fuel cell system 100, such as the drive motor 53, the auxiliary machines and the like (hereinafter, referred to as "system required power").

In a light load region where power generation efficiency of the fuel cell stack 1 lowers, that is, in a region where the system required power is a predetermined value or less, the controller 6 stops the supply of the cathode gas to the fuel cell stack 1, and prohibits extraction of the electric power from the fuel cell stack 1 to carry out idle stop in which the drive motor 53, the auxiliary machines and the like are driven by the electric power of the battery 55. When, for example, the accelerator pedal is depressed and the system required power becomes greater than the predetermined value during the idle stop, the controller 6 restarts the extraction of the electric power from the fuel cell stack 1, and makes a recovery from the idle stop.

Here, there is a method of maintaining oxygen concentration on the cathode side within the fuel cell stack 1 to predetermined concentration or more during the idle stop in consideration of a delay in response of the cathode gas (a delay since the cathode compressor 34 is driven until the oxygen concentration inside the fuel cell stack 1 is increased) in order to suppress a delay in power generation caused by oxygen deficiency within the fuel cell stack 1 (deterioration in transient performance) at the time of the recovery from the idle stop. This is a method of maintaining the output voltage of the fuel cell stack 1 during the idle stop to the predetermined voltage or higher by focusing on a correlation between the output voltage of the fuel cell stack 1 and the oxygen concentration on the cathode side of the fuel cell stack 1 during the idle stop.

Figure 2:
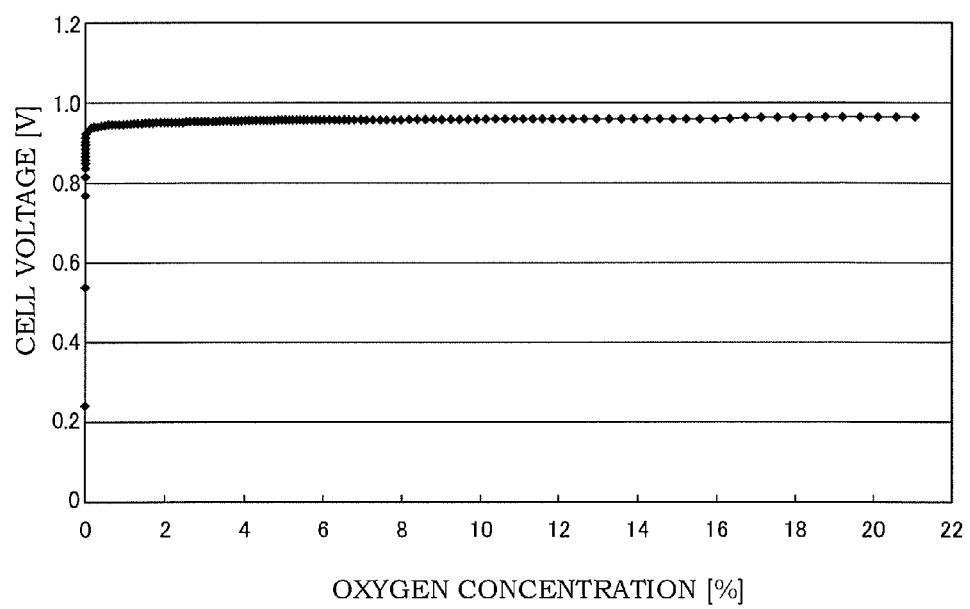
FIG. 2 is a view illustrating a relationship between oxygen concentration on a cathode side in a fuel cell stack and a cell voltage during idle stop.

FIG. 2 is a view illustrating a relationship between the oxygen concentration on the cathode side in the fuel cell stack 1 and the voltage of each of the fuel cells constituting the fuel cell stack 1 (hereinafter, referred to as a "cell voltage") during the idle stop.

When the idle stop is carried out, the extraction of the electric power from the fuel cell stack 1 is prohibited. For this reason, the cell voltage temporarily increases to an open end voltage (about 0.95 [V]). Then, during the idle stop, the supply of the cathode gas to the fuel cell stack 1 is stopped, and the anode gas, which has penetrated from an anode side to a cathode side via the electrolyte membrane, reacts with the cathode gas that remains on the cathode side. As a result, the oxygen concentration on the cathode side is gradually reduced, and accordingly, the cell voltage is gradually lowered from the open end voltage.

Here, as shown in FIG. 2, the cell voltage exceeds 0.9 [V] even though the oxygen concentration on the cathode side of the fuel cell stack 1 is 1%. For that reason, in a case where the oxygen concentration on the cathode side of the fuel cell stack 1 is to be maintained at the predetermined concentration or more, it is necessary to maintain the cell voltage at a high voltage that is close to the open end voltage during the idle stop.

However, it is known that, when the cell voltage is maintained at the high voltage closer to the open end voltage, each fuel cell is deteriorated due to melting of platinum in the electrodes of each fuel cell. In a case where the cell voltage is to be reduced to the voltage (about 0.85 [V]) at which the platinum can be suppressed from melting, the oxygen concentration on the cathode side of the fuel cell stack 1 becomes less than 1%, and thus, the effect of suppressing the delay in power generation at the time of the recovery from the idle stop can hardly be expected.

As a result of intensive research by the present inventors, it is further found out that, in a case where the state, in which the cell voltage is the predetermined voltage (0.7 [V], for example) or higher, continues even though the cell voltage is kept at the voltage capable of suppressing the melting of the platinum (about 0.85 [V]), a surface of a platinum catalyst contained in the electrodes of each fuel cell is covered by an oxide film, and IV characteristics of the fuel cell (voltage/current characteristics) are thus lowered. This causes the output voltage of the fuel cell stack 1 to be transitionally lowered at the time of the recovery from the idle stop. Hereinafter, this problem will be explained with reference to FIG. 3.

Figure 3:
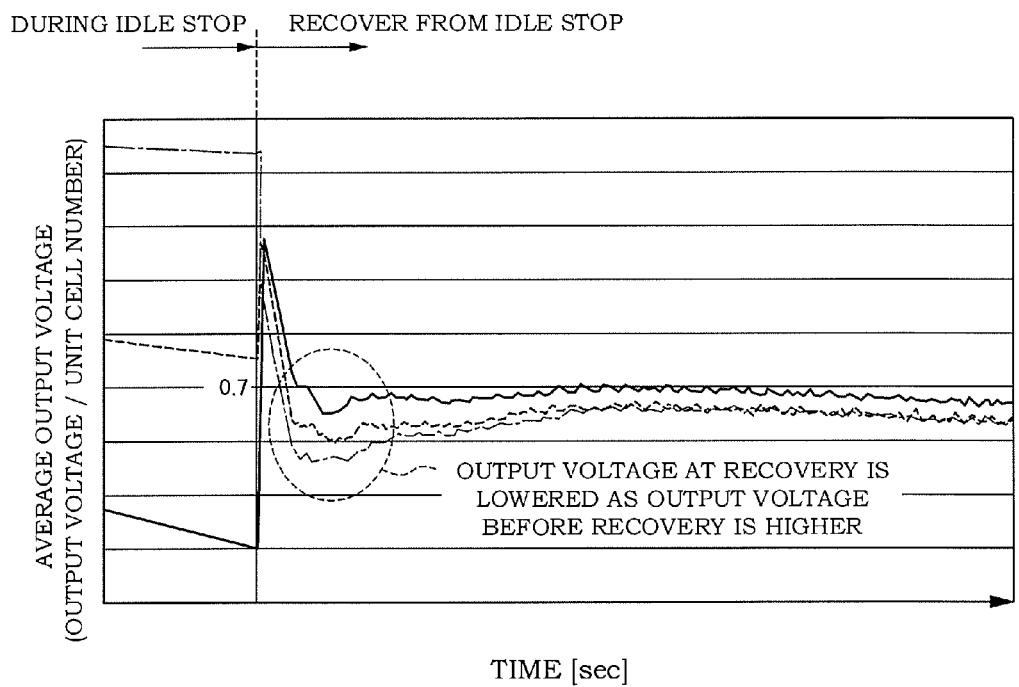
FIG. 3 is a view in which drop degrees of output voltages when predetermined electric power is extracted from the fuel cell stack at the time of recovery from the idle stop are compared in accordance with the output voltage of the fuel cell stack immediately before the recovery.

FIG. 3 is a view in which drop degrees of output voltages when predetermined electric power is extracted from the fuel cell stack 1 at the time of recovery from the idle stop are compared in accordance with the output voltage of the fuel cell stack 1 immediately before the recovery.

As shown in FIG. 3, it is found out that the higher the output voltage of the fuel cell stack 1 immediately before the recovery from the idle stop is, the more the output voltage of the fuel cell stack 1 is transitionally lowered at the time of the recovery from the idle stop.

It is thought that this is because of reasons as follows. In a case where the state in which the output voltage of each fuel cell is the predetermined voltage (0.7 [V], for example) or higher continues, the surface of the platinum catalyst contained in the electrodes of each fuel cell is covered by the oxide film to lower the IV characteristics of each cell (voltage/current characteristics). In a case where the state in which the output voltage is the predetermined voltage or less continues, the oxide film is gradually removed, and the IV characteristics of each fuel cell are recovered.

Thus, in a case where the drop degree of the output voltage becomes greater at the time when the electric power is extracted from the fuel cell stack 1 during the recovery from the idle stop, there is a fear that the output voltage of the fuel cell stack 1 transitionally fall below a minimum operation voltage of the drive motor 53 during the recovery from the idle stop. Since the drive motor 53 cannot be driven in such a case, this leads to deterioration in drivability and system failure.

Therefore, in the present embodiment, the output voltage of each fuel cell is not basically maintained at the high voltage during the idle stop, and the electric power extracted from the fuel cell stack 1 is limited on the basis of the output voltage of the stack immediately before the recovery from the idle stop. Hereinafter, an idle stop control according to the present embodiment will be explained.

Figure 4:
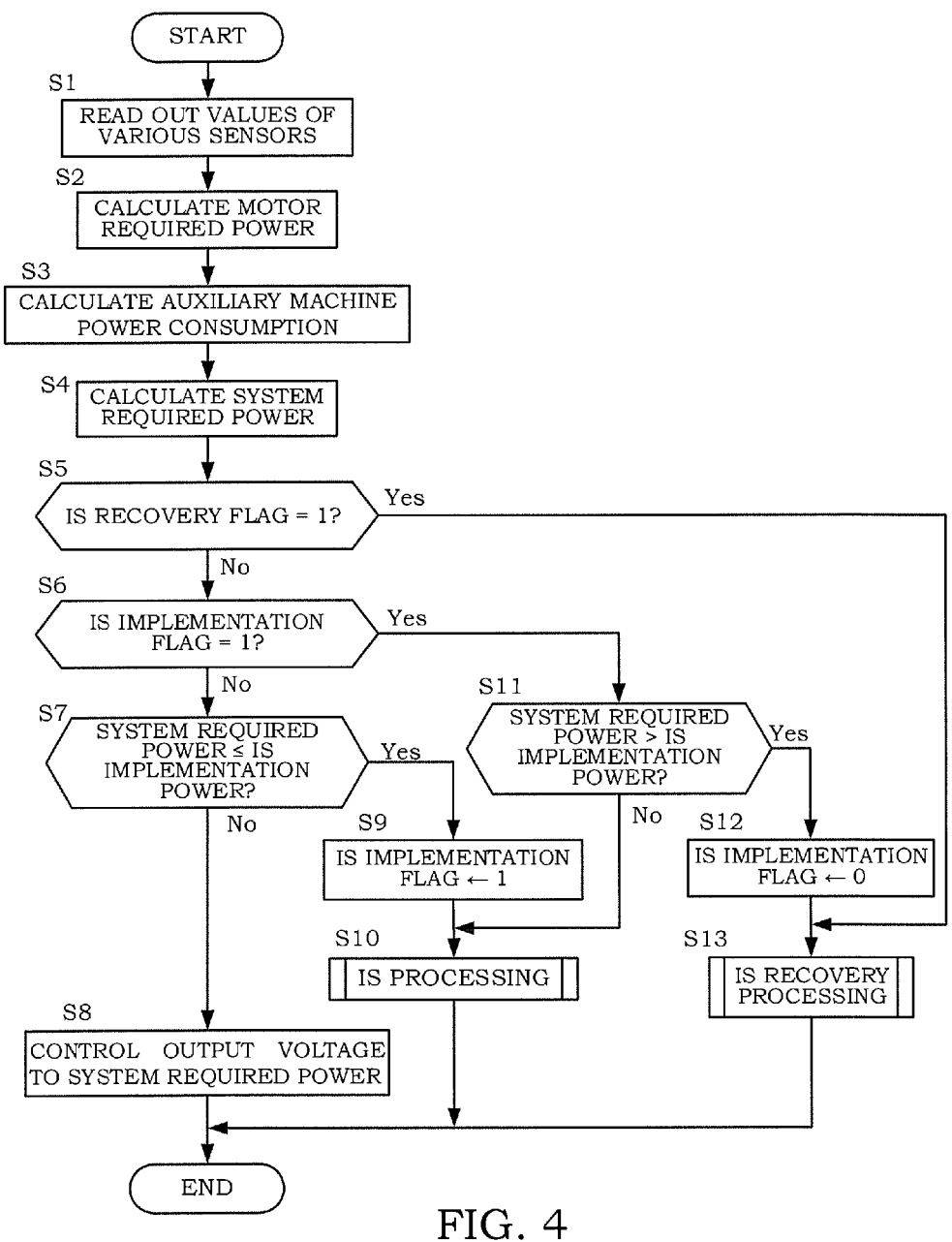
FIG. 4 is a flowchart for explaining an idle stop control according to the first embodiment of the present invention.

FIG. 4 is a flowchart for explaining the idle stop control according to the present embodiment. The controller 6 carries out this routine with a predetermined operation period (10 [ms], for example).

At Step S1, the controller 6 reads out the detection values of the various sensors as described above.

At Step S2, the controller 6 calculates the power required for driving the drive motor 53 (hereinafter, referred to as "motor required power") on the basis of the accelerator operation amount.

At Step S3, the controller 6 calculates power consumption of the driven auxiliary machines (hereinafter, referred to as "auxiliary machine power consumption").

At Step S4, the controller 6 calculates the system required power by adding the auxiliary machine power consumption to the motor required power.

At Step S5, the controller 6 determines whether an idle stop recovery flag (hereinafter, referred to as an "IS recovery flag") is set to one or not. The IS recovery flag is a flag that is set to one at the time of the recovery from the idle stop, and an initial value thereof is set to zero. In a case where the IS recovery flag is set to zero, the controller 6 carries out a process at Step S6. In a case where the IS recovery flag is set to one, the controller 6 carries out a process at Step S13.

At Step S6, the controller 6 determines whether an idle stop implementation flag (hereinafter, referred to as an "IS implementation flag") is set to one or not. The IS implementation flag is a flag that is set to one at the time when the idle stop is carried out, and an initial value thereof is set to zero. In a case where the IS implementation flag is set to zero, the controller 6 carries out a process at Step S7. In a case where the IS implementation flag is set to one, the controller 6 carries out a process at Step S11.

At Step S7, the controller 6 determines whether or not the system required power is idle stop implementation power (hereinafter, referred to as "IS implementation power") or less. In a case where the system required power is greater than the IS implementation power, the controller 6 carries out a process at Step S8 without carrying out the idle stop. On the other hand, in a case where the system required power is the IS implementation power or less, the controller 6 carries out a process at Step S9 to carry out the idle stop because the power generation efficiency of the fuel cell stack 1 is lowered.

At Step S8, the controller 6 controls, on the basis of IV characteristics of the fuel cell stack 1 that are obtained in advance by experiments and the like, the output voltage of the fuel cell stack 1 with the DC/DC converter 56 so that the generation power of the fuel cell stack 1 becomes the system required power.

At Step S9, the controller 6 sets the IS implementation flag to one.

At Step S10, the controller 6 carries out idle stop processing (hereinafter, referred to as "IS processing"). Details of the IS processing will be explained with reference to FIG. 5.

At Step S11, the controller 6 determines whether the system required power becomes greater than the IS implementation power or not. In a case where the system required power is the IS implementation power or less, the controller 6 carries out the process at Step S10 to continue the idle stop. On the other hand, in a case where the system required power is greater than the IS implementation power, the controller 6 carries out a process at Step S12 to recover from the idle stop.

At Step S12, the controller 6 sets the IS implementation flag to zero.

At Step S13, the controller 6 carries out idle stop recovery processing (hereinafter, referred to as "IS recovery processing"). Details of the IS recovery processing will be explained with reference to FIG. 6.

Figure 5:
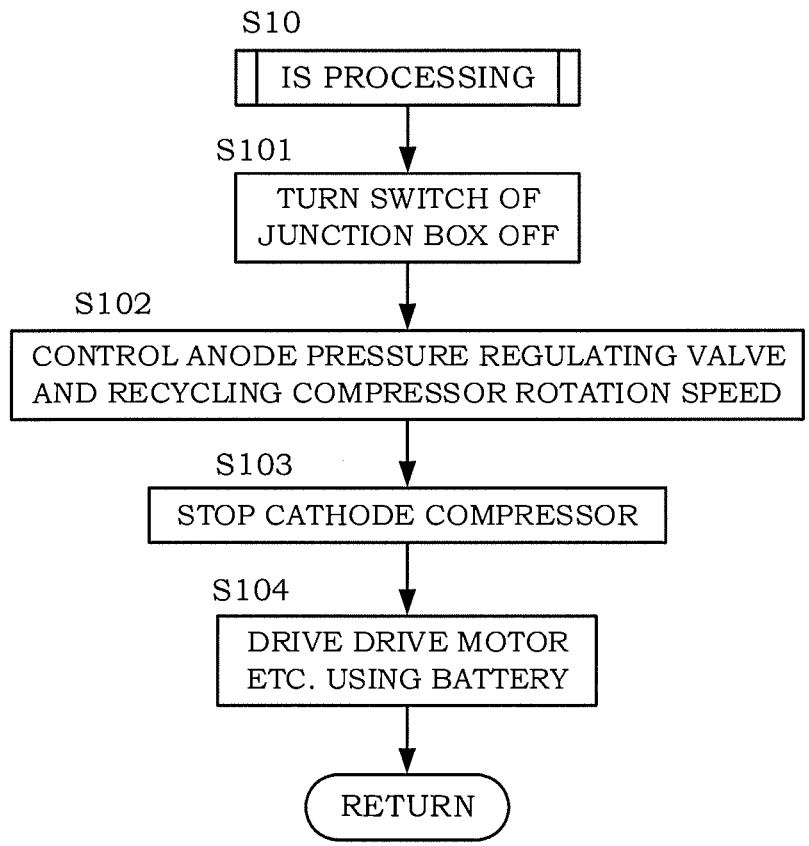
FIG. 5 is a flowchart for explaining IS processing according to the first embodiment of the present invention.

FIG. 5 is a flowchart for explaining the IS processing.

At Step S101, the controller 6 opens the switch 571 of the junction box 57 to prohibit the extraction of the electric power from the fuel cell stack 1.

At Step S102, the controller 6 respectively controls an opening degree of the anode pressure regulating valve 23 and a rotation speed of the recycling compressor 26 to a predetermined opening degree and a predetermined rotation speed that are determined in advance by experiments and the like so that the anode gas, whose amount is the same as that of the anode gas that has penetrated from the anode side to the cathode side during the idle stop, is supplied to the anode side.

At Step S103, the controller 6 stops the cathode compressor 34.

At Step S104, the controller 6 drives the drive motor 53 and the auxiliary machines with the electric power of the battery 55.

Figure 6:
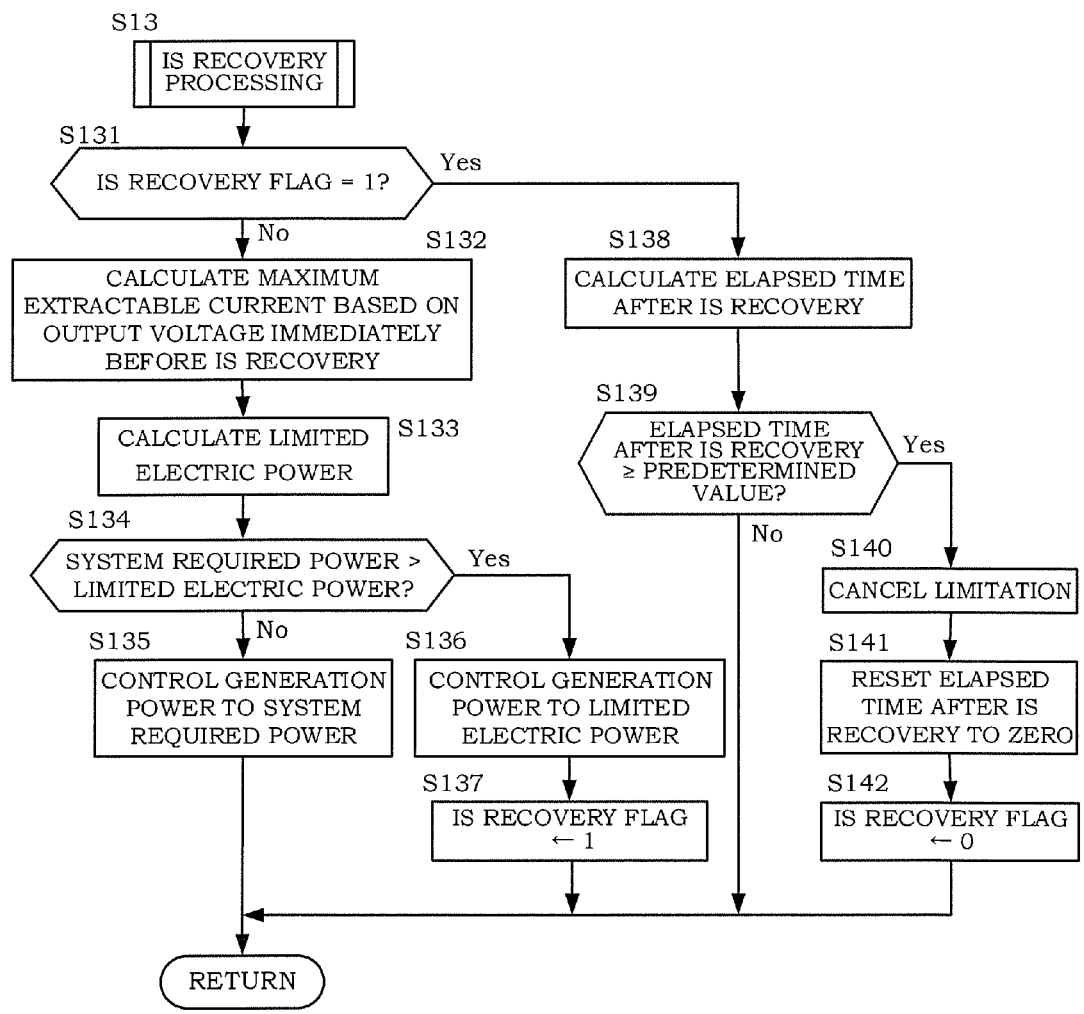
FIG. 6 is a flowchart for explaining IS recovery processing according to the first embodiment of the present invention.

FIG. 6 is a flowchart for explaining the IS recovery processing.

At Step S131, the controller 6 determines whether the IS recovery flag is set to one or not. In a case where the IS recovery flag is set to zero, the controller 6 carries out a process at Step S132. In a case where the IS recovery flag is set to one, the controller 6 carries out a process at Step S138.

At Step S132, the controller 6 refers to a table in FIG. 7 and calculates, on the basis of the output voltage of the fuel cell stack 1 that is detected immediately before the recovery from the idle stop, an upper limit value of a current that can be extracted from the fuel cell stack 1 at the time of the recovery from the idle stop (hereinafter, referred to as a "maximum extractable current").

At Step S133, the controller 6 calculates, on the basis of the maximum extractable current, an upper limit value of electric power that can be extracted from the fuel cell stack 1 at the time of the recovery from the idle stop (hereinafter, referred to as "limited electric power").

At Step S134, the controller 6 determines whether the system required power is greater than the limited electric power or not. In a case where the system required power is the limited electric power or less, the controller 6 carries out a process at Step S135. On the other hand, in a case where the system required power is greater than the limited electric power, the controller 6 carries out a process at Step S136.

At Step S135, the controller 6 controls, on the basis of the IV characteristics of the fuel cell stack 1 that are obtained in advance by the experiments and the like, the output voltage of the fuel cell stack 1 by means of the DC/DC converter 56 so that the generation power of the fuel cell stack 1 becomes the system required power.

At Step S136, the controller 6 controls, on the basis of the IV characteristics of the fuel cell stack 1 that are obtained in advance by the experiments and the like, the output voltage of the fuel cell stack 1 by means of the DC/DC converter 56 so that the generation power of the fuel cell stack 1 becomes the limited electric power. This causes the output current of the fuel cell stack 1 to be limited to the maximum extractable current.

At Step S137, the controller 6 sets the IS recovery flag to one.

At Step S138, the controller 6 calculates an elapsed time since the IS recovery flag is set to one, that is, the elapsed time after the recovery from the idle stop (hereinafter, referred to as an "elapsed time after the IS recovery").

At Step S139, the controller 6 determines whether or not the elapsed time after the IS recovery becomes a predetermined value or more. The predetermined value is a period of time since the output voltage is transitionally lowered until the output voltage returns to a stationary state at the time of the recovery from the idle stop. The predetermined value is determined in advance by experiments and the like. In a case where the elapsed time after the IS recovery is less than the predetermined value, the controller 6 terminates this processing. On the other hand, in a case where the elapsed time after the IS recovery is the predetermined value or more, the controller 6 carries out a process at Step S140.

At Step S140, the controller 6 cancels the limitation on the generation power of the fuel cell stack 1.

At Step S141, the controller 6 resets the elapsed time after the IS recovery to zero.

At Step S142, the controller 6 sets the IS recovery flag to zero.

According to the present embodiment as explained above, the current extracted from the fuel cell stack 1 after the recovery from the idle stop is limited on the basis of the output voltage of the fuel cell stack 1 before the recovery from the idle stop. More specifically, by setting the upper limit of the electric power extracted from the fuel cell stack 1, the current extracted from the fuel cell stack 1 is limited.

This makes it possible to suppress the lowering of the output voltage at the time of the recovery from the idle stop.

Further, at the time of the recovery from the idle stop, it is possible to prevent the output voltage of the fuel cell stack 1 from transitionally falling below the minimum operation voltage of the drive motor 53. Thus, deterioration in drivability and system failure can be prevented. Further, the cell voltage is lowered to a low voltage, at which the oxide film of the platinum catalyst is removed, without maintaining the cell voltage at the high voltage during the idle stop. Thus, it is possible to prevent the platinum catalyst from melting during the idle stop, and it is also possible to suppress temporary deterioration in the IV characteristics due to the platinum catalyst covered by the oxide film after the recovery from the idle stop. As a result, it is possible to suppress the deterioration in output performance after the recovery from the idle stop.

Second Embodiment

Next, a second embodiment of the present invention will be explained. The present embodiment is different from the first embodiment in that a current extraction profile at the time of the transition after the recovery from the idle stop is determined on the basis of the output voltage of the fuel cell stack 1 detected before the recovery from the idle stop. Hereinafter, the description will be given while focusing on the difference. In this regard, the same reference numerals are used in each of the following embodiments to designate the parts that respectively perform the similar functions to those in the first embodiment described above, and repeated explanations are omitted as appropriate.

Figure 8:
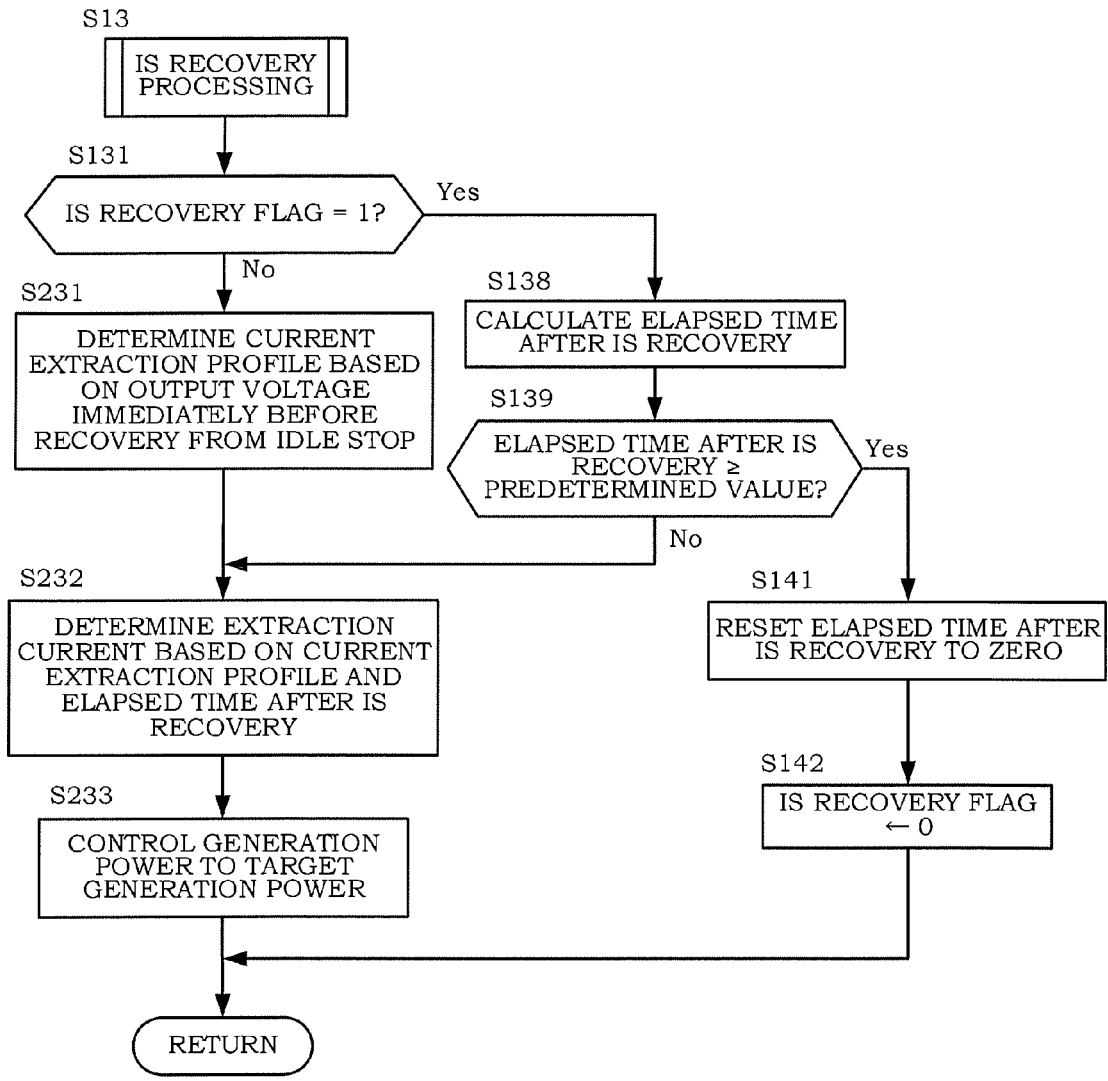
FIG. 8 is a flowchart for explaining the IS recovery processing according to a second embodiment of the present invention.

FIG. 8 is a flowchart for explaining the IS recovery processing according to the present embodiment.

Figure 9:
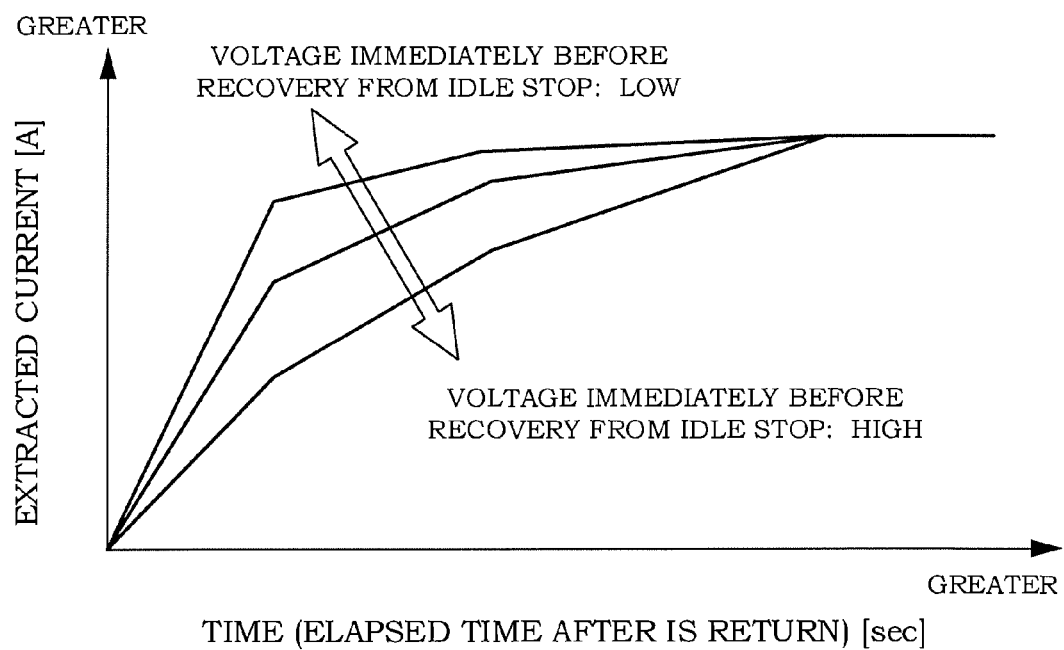
FIG. 9 is a view illustrating a current extraction profile at the time of transition after the recovery from the idle stop.

At Step S231, the controller 6 determines, on the basis of the output voltage of the fuel cell stack 1 that is detected immediately before the recovery from the idle stop, the current extraction profile at the time of the transition after the recovery from the idle stop as shown in FIG. 9.

The current extraction profile is set so that the higher the output voltage of the fuel cell stack 1 detected immediately before the recovery from the idle stop is, the lower the output current at the time of the transition after the recovery from the idle stop becomes. In addition, the current extraction profile is set in consideration of a change in moisture content (humidity) of the electrolyte membrane at the time of the transition after the recovery from the idle stop and the delay in the response of the cathode gas.

At Step S232, the controller 6 refers to the determined current extraction profile, and determines an extraction current from the fuel cell stack 1 on the basis of the elapsed time after the IS recovery.

At Step S233, the controller 6 calculates target generation power of the fuel cell stack 1 on the basis of the extraction current that is determined at Step S232, and controls the output voltage of the fuel cell stack 1 by means of the DC/DC converter 56 so that the generation power of the fuel cell stack 1 becomes the target generation power.

According to the present embodiment as described above, the current extraction profile at the time of the transition after the recovery from the idle stop is determined on the basis of the output voltage of the fuel cell stack 1 that is detected before the recovery from the idle stop.

This current extraction profile is set so that the higher the output voltage of the fuel cell stack 1 detected before the recovery from the idle stop is, the lower the output current at the time of the transition after the recovery from the idle stop becomes. In addition, the current extraction profile is set in consideration of a change in a wet state (moisture content) of the electrolyte membrane at the time of the transition after the recovery from the idle stop and the delay in the response of the cathode gas.

Therefore, it is possible to prevent the output voltage of the fuel cell stack 1 from falling below the minimum operation voltage of the drive motor 53 at the time of the transition after the recovery from the idle stop, and it is also possible to determine the optimum current extraction amount according to the state of the fuel cell stack 1 at the time of the transition.

Third Embodiment

Next, a third embodiment of the present invention will be explained. The present embodiment is different from the first embodiment in that the output voltage of the fuel cell stack 1 during the idle stop is estimated on the basis of a duration time of the idle stop (hereinafter, referred to as an "IS time"). Hereinafter, the description will be given while focusing on the difference.

Since the anode gas penetrates from the anode side to the cathode side via the electrolyte membrane during the idle stop, the output voltage of the fuel cell stack 1 is reduced as time passes.

Therefore, in the present embodiment, by obtaining a relationship between an idle stop time and the output voltage of the fuel cell stack 1 in advance by experiments and the like, the output voltage of the fuel cell stack 1 immediately before the recovery from the idle stop is estimated on the basis of the idle stop time.

Figure 10:
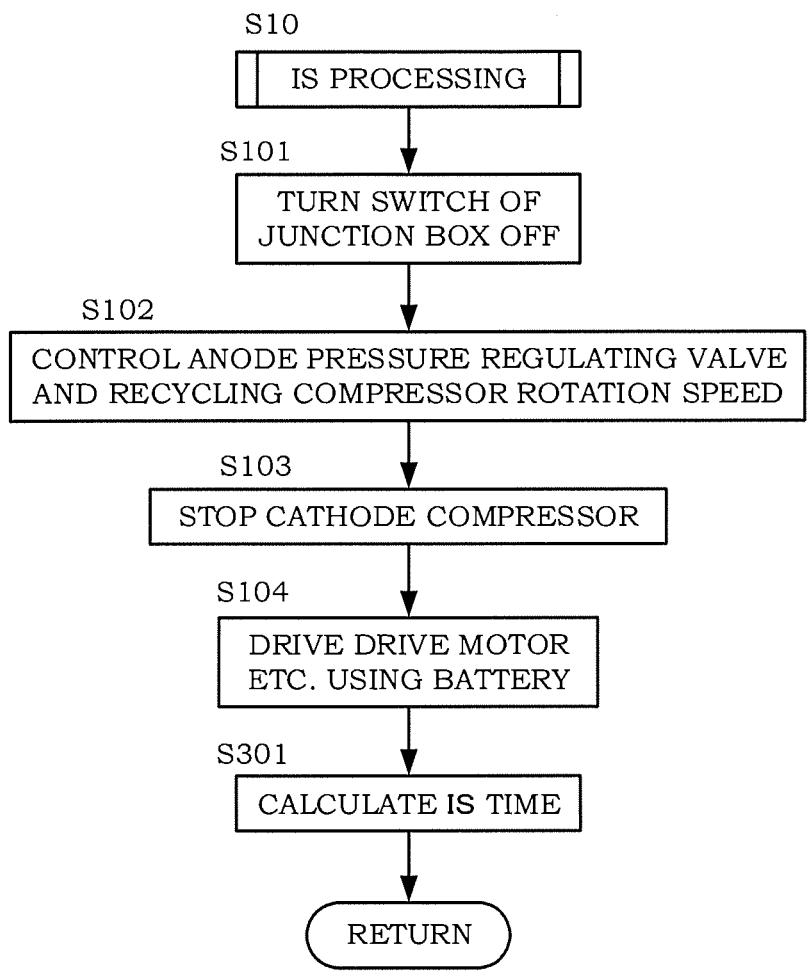
FIG. 10 is a flowchart for explaining the IS processing according to a third embodiment of the present invention.

FIG. 10 is a flowchart for explaining the IS processing according to the present embodiment.

At Step S301, the controller 6 calculates an elapsed time since the IS implementation flag is set to one, that is, the IS time.

Figure 11:
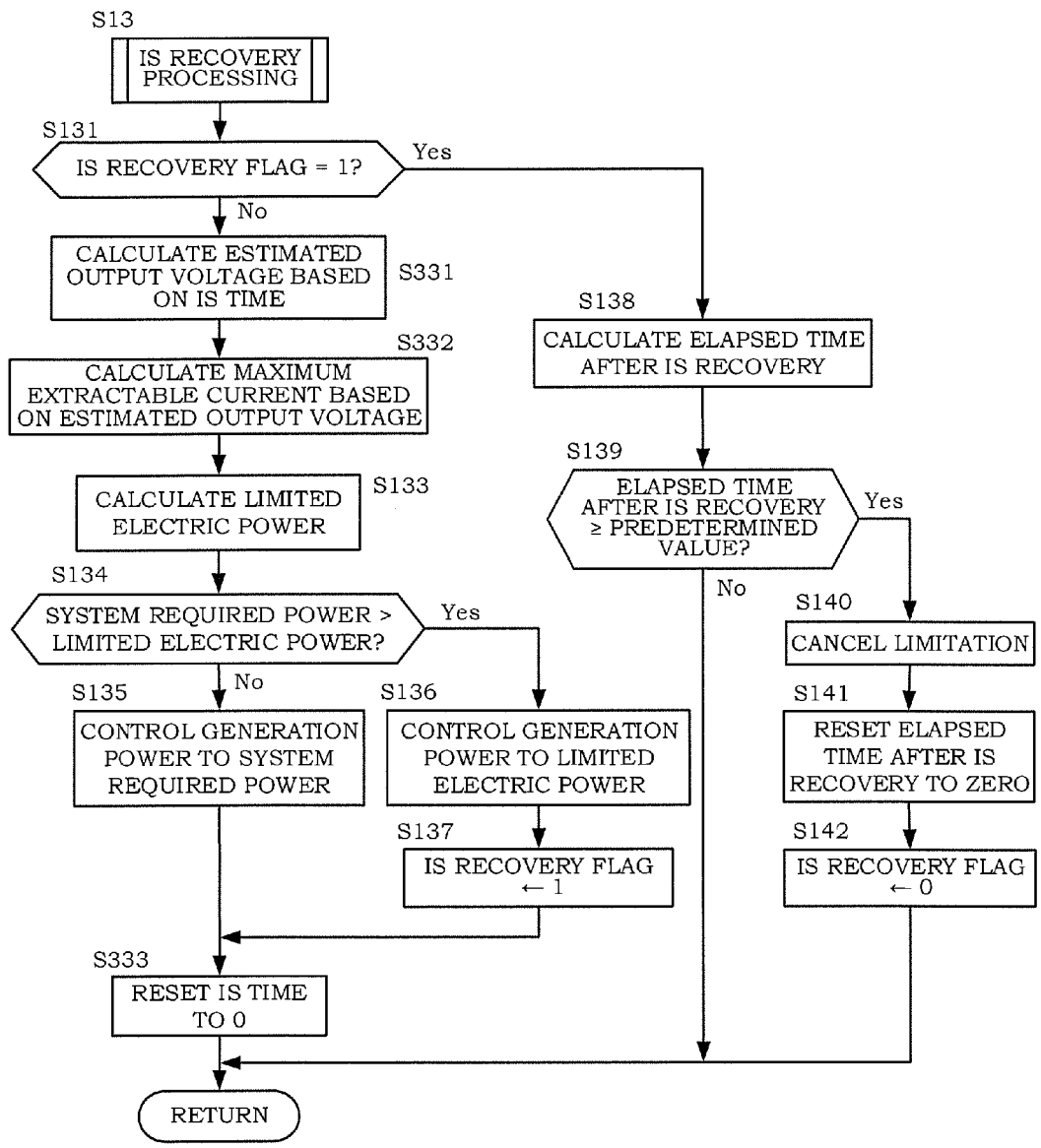
FIG. 11 is a flowchart for explaining the IS recovery processing according to the third embodiment of the present invention.

FIG. 11 is a flowchart for explaining the IS recovery processing according to the present embodiment.

Figure 12:
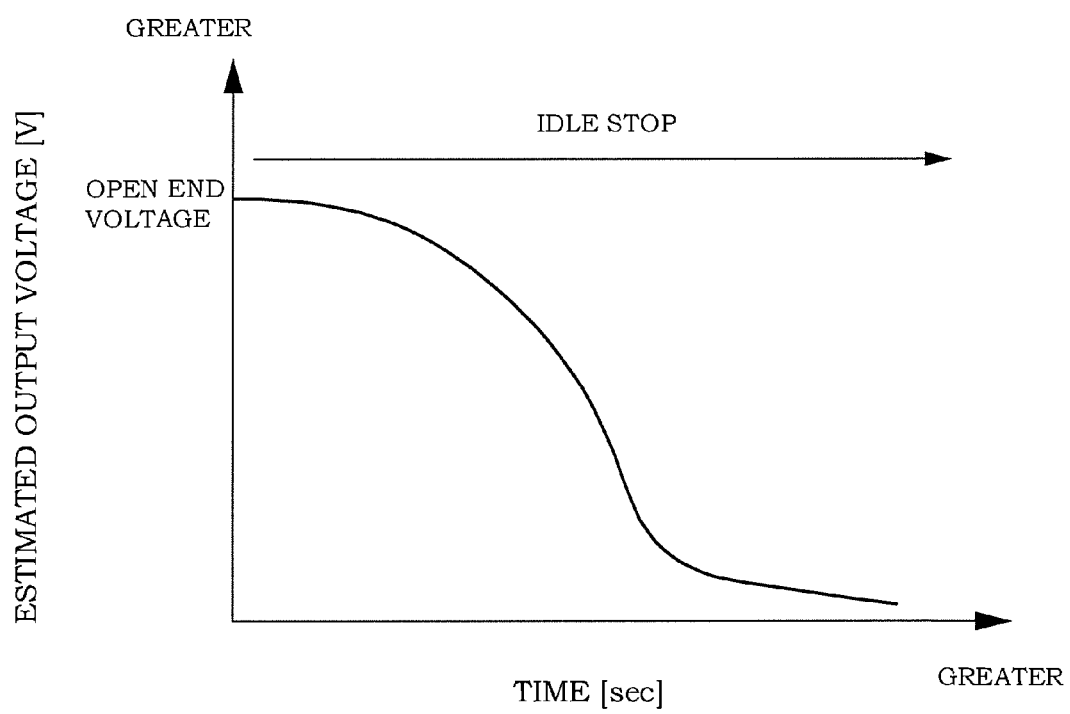
FIG. 12 is a table for estimating the output voltage of the fuel cell stack on the basis of an IS time.

At Step S331, the controller 6 refers to a table in FIG. 12, and estimates, on the basis of the IS time, the output voltage of the fuel cell stack 1 at the time of the recovery from the idle stop. In this regard, the table in FIG. 12 illustrates a change in the output voltage during the idle stop at the state where temperature and the moisture content of the electrolyte membrane in the fuel cell are respectively maintained at certain reference values.

Figure 7:
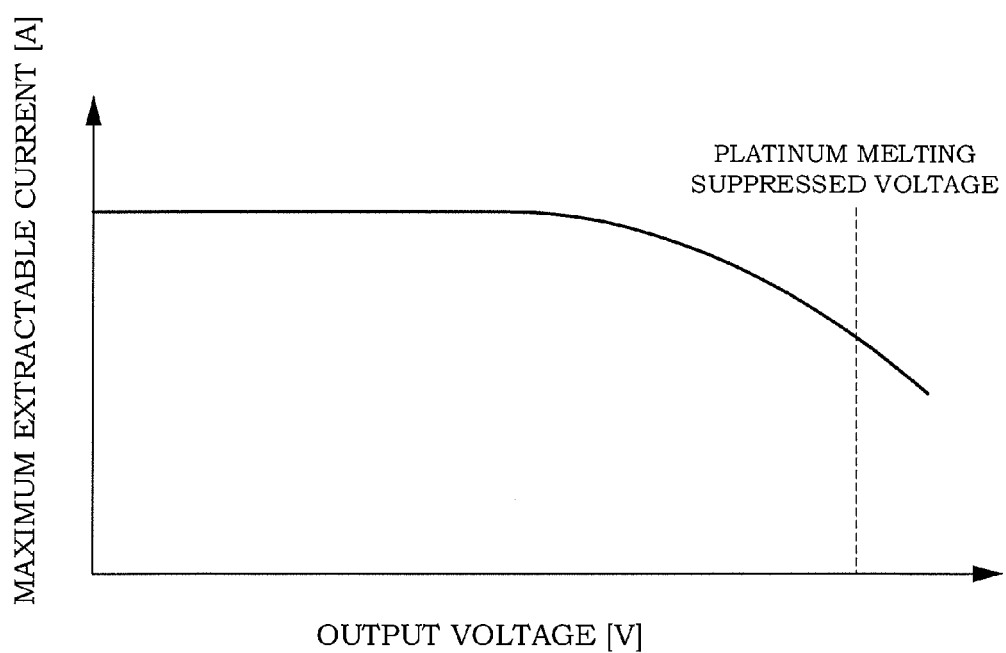
FIG. 7 is a table for calculating the maximum extractable current on the basis of the output voltage of the fuel cell stack.

At Step S332, the controller 6 refers to the table in FIG. 7 described above, and calculates the maximum extractable current on the basis of the estimated output voltage.

At Step S333, the controller 6 resets the IS time to zero.

According to the present embodiment as explained above, the output voltage of the fuel cell stack 1 before the recovery from the idle stop is estimated on the basis of the elapsed time (IS time) since the supply of the cathode gas is stopped during the idle stop. Thus, it is possible to obtain the similar effects to those in the first embodiment without using the voltage sensor 52.

Fourth Embodiment

Next, a fourth embodiment of the present invention will be explained. The present embodiment is different from the third embodiment in that the estimated output voltage calculated on the basis of the IS time is corrected in accordance with the temperature of the cooling water of the fuel cell stack 1. Hereinafter, the description will be given while focusing on the difference.

Figure 13:
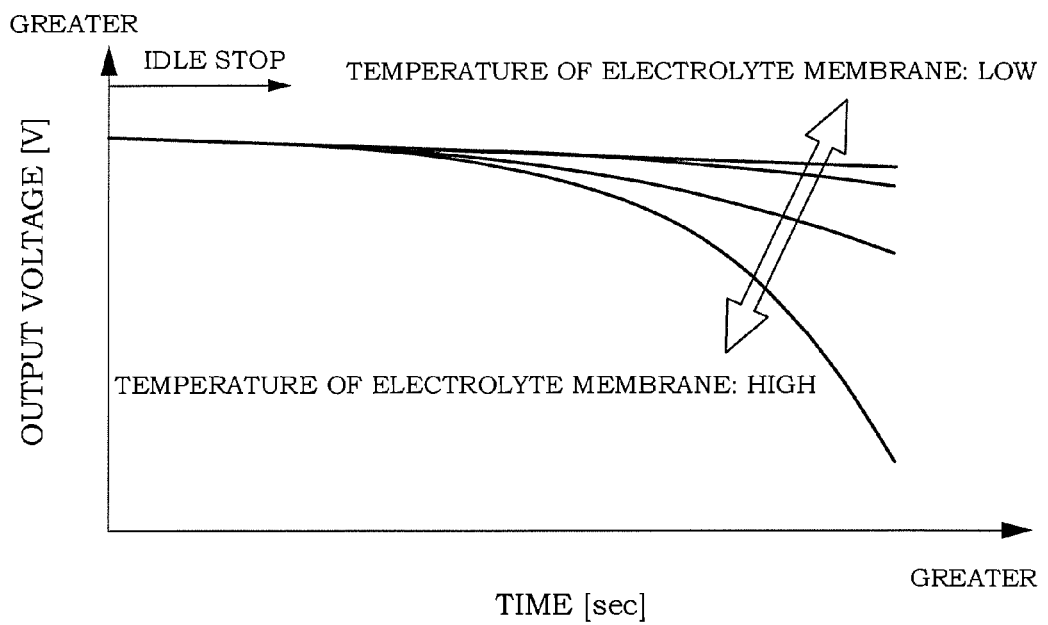
FIG. 13 is a view illustrating a relationship between temperature of an electrolyte membrane of the fuel cell and a dropping speed of the output voltage during the idle stop.

The amount of the anode gas that penetrates from the anode side to the cathode side increases as the temperature of the electrolyte membrane of each fuel cell becomes higher. For that reason, as shown in FIG. 13, the higher the temperature of the electrolyte membrane of each fuel cell becomes, the faster a dropping speed of the output voltage during the idle stop becomes.

Therefore, in the present embodiment, the estimated output voltage is corrected on the basis of the temperature of the cooling water of the fuel cell stack 1, which represents the temperature of the electrolyte membrane, that is, more specifically, average temperature of the inlet water temperature and the outlet water temperature (hereinafter, referred to as "inlet/outlet average water temperature").

Figure 14:
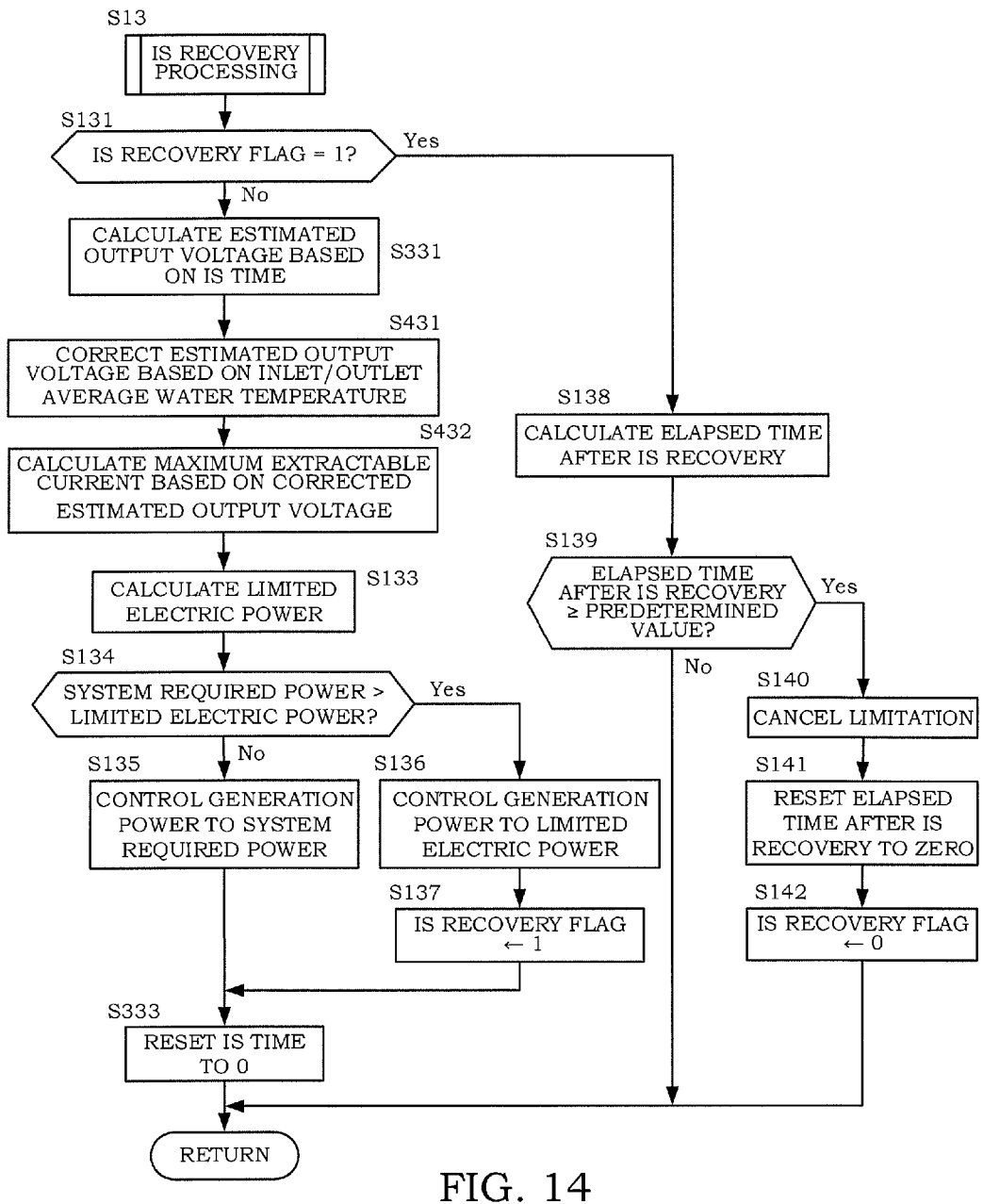
FIG. 14 is a flowchart for explaining the IS recovery processing according to a fourth embodiment of the present invention.

FIG. 14 is a flowchart for explaining the IS recovery processing according to the present embodiment.

At Step S431, the controller 6 corrects the estimated output voltage on the basis of the inlet/outlet average water temperature of the fuel cell stack 1. More specifically, in a case where the inlet/outlet average water temperature of the fuel cell stack 1 is higher than the temperature of the electrolyte membrane that serves as a reference in making the table in FIG. 12, the estimated output voltage is corrected so as to be smaller. In a case where the inlet/outlet average water temperature of the fuel cell stack 1 is lower than the reference temperature, the estimated output voltage is corrected so as to be greater.

At Step S432, the controller 6 refers to the table in FIG. 7 described above, and calculates the maximum extractable current on the basis of the estimated output voltage thus corrected.

According to the present embodiment as described above, the estimated output voltage, calculated on the basis of the IS time, is corrected in accordance with the temperature of the fuel cell stack 1 (i.e., the inlet/outlet average water temperature). Thus, it is possible to obtain the similar effects to those in the third embodiment, and it is also possible to accurately estimate the output voltage during the idle stop in accordance with the state of the fuel cell stack 1.

Fifth Embodiment

Next, a fifth embodiment of the present invention will be explained. The present embodiment is different from the third embodiment in that the estimated output voltage, calculated on the basis of the IS time, is corrected in accordance with the moisture content (humidity) of the electrolyte membrane. Hereinafter, the description will be given while focusing on the difference.

Figure 15:
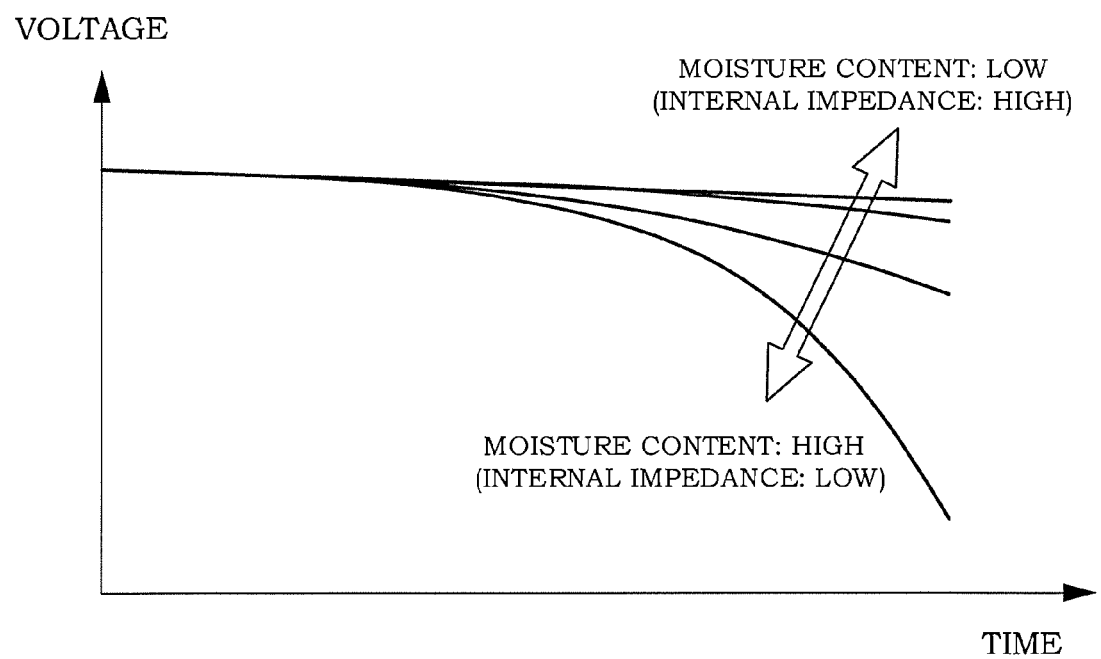
FIG. 15 is a view illustrating a relationship between a moisture content of the electrolyte membrane of the fuel cell and the dropping speed of the output voltage during the idle stop.

The amount of the anode gas that penetrates from the anode side to the cathode side increases as the moisture content of the electrolyte membrane of each fuel cell becomes higher. For that reason, as shown in FIG. 15, the higher the moisture content of the electrolyte membrane of each fuel cell becomes, the faster the dropping speed of the output voltage during the idle stop becomes.

Therefore, in the present embodiment, the estimated output voltage is corrected on the basis of internal impedance of the fuel cell stack 1, which represents the moisture content of the electrolyte membrane. It should be noted that the internal impedance of the fuel cell stack 1 becomes lower as the moisture content of the electrolyte membrane becomes higher.

Figure 16:
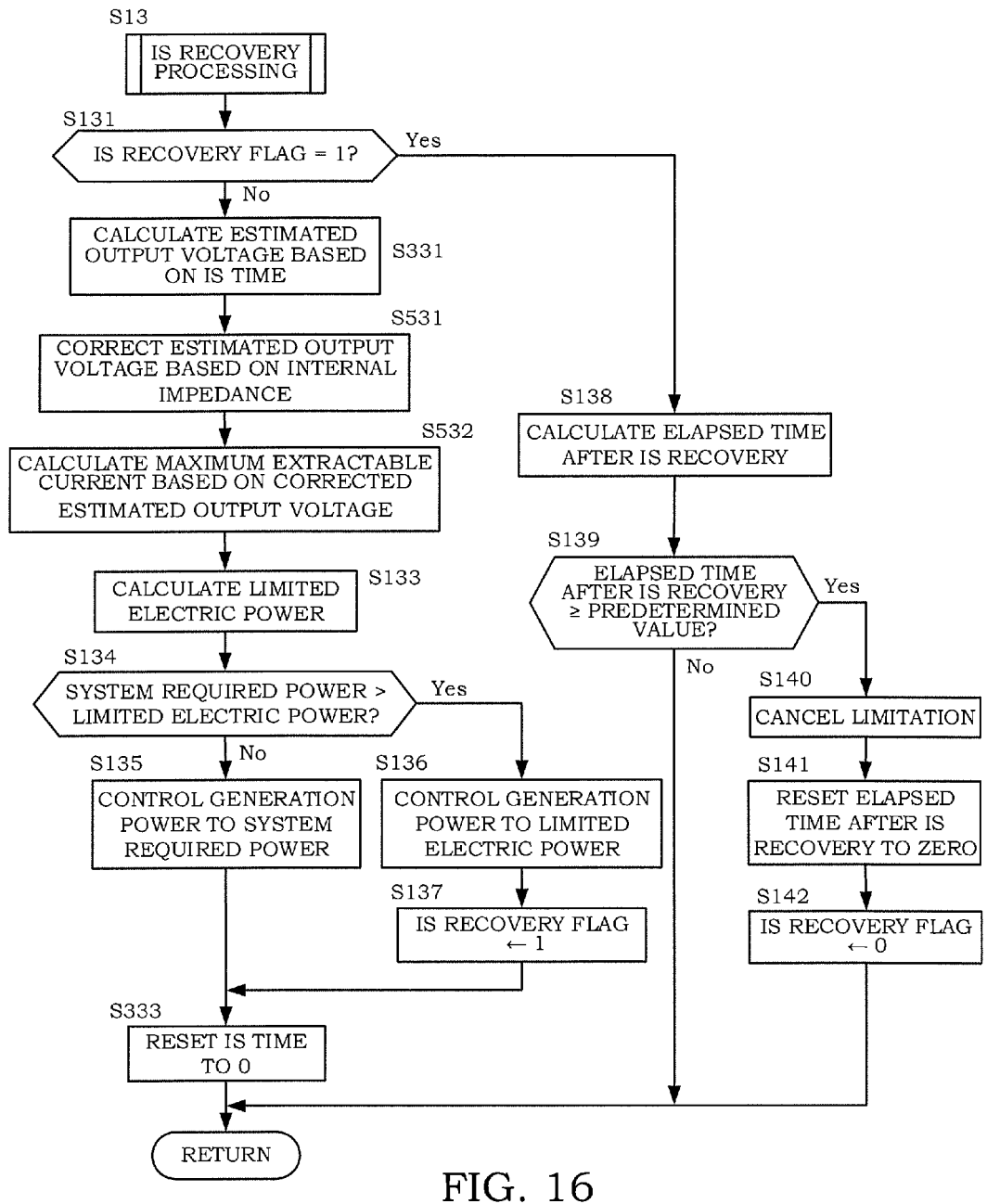
FIG. 16 is a flowchart for explaining the IS recovery processing according to a fifth embodiment of the present invention.

FIG. 16 is a flowchart for explaining the IS recovery processing according to the present embodiment.

At Step S531, the controller 6 corrects the estimated output voltage on the basis of the internal impedance of the fuel cell stack 1. More specifically, in a case where the internal impedance of the fuel cell stack 1 is lower than the internal impedance that corresponds to the moisture content of the electrolyte membrane as the reference in making the table in FIG. 15, the estimated output voltage is corrected so as to be smaller. In a case where the internal impedance is higher than the reference internal impedance, the estimated output voltage is corrected so as to be greater.

It should be noted that any known method, such as an AC impedance method or the like, may be adopted as a method of detecting the internal impedance of the fuel cell stack 1.

At Step S532, the controller 6 refers to the table in FIG. 7 described above, and calculates the maximum extractable current on the basis of the estimated output voltage thus corrected.

According to the present embodiment as described above, the estimated output voltage, calculated on the basis of the IS time, is corrected in accordance with the humidity of the fuel cell stack 1 (humidity of the electrolyte membrane of the fuel cell). Thus, it is possible to obtain the similar effects to those in the third embodiment, and it is also possible to accurately estimate the output voltage during the idle stop in accordance with the state of the fuel cell stack 1.

Although the embodiments of the present invention have been explained described above, the above embodiments are only a part of application examples of the present invention. The technical scope of the present invention is not limited to the specific configurations of the embodiments described above.

For example, in the first embodiment, the maximum extractable current is calculated on the basis of the output voltage of the fuel cell stack 1. However, the calculation may be made as follows.

Since the anode gas penetrates from the anode side to the cathode side via the electrolyte membrane during the idle stop, the output voltage of the fuel cell stack 1 is reduced as time passes.

Here, the amount of the anode gas that penetrates from the anode side to the cathode side varies in accordance with a thickness, the temperature and the moisture content of the electrolyte membrane of each fuel cell. However, there is manufacturing variation to some extent in the thickness of the electrolyte membrane of each fuel cell. In addition, the temperature and the moisture content of the electrolyte membrane of each fuel cell also vary to some extent in accordance with a place thereof.

For this reason, a voltage of each of the fuel cells of the fuel cell stack 1 or a voltage of a group of fuel cells, including the predetermined number of the fuel cells, may be detected, and the maximum extractable current may be calculated on the basis of the highest cell voltage among these fuel cells, or the voltage of the group of fuel cells. This makes it possible to surely prevent the output voltage of the fuel cell stack 1 from transitionally falling below the minimum operation voltage of the drive motor 53 at the time of the recovery from the idle stop.

Further, in any of the embodiments described above, the cathode compressor 34 may be temporarily driven during the idle stop. This is because there are volumes, such as the cathode gas supply passage 31, the WRD 36 and the like, in the passage from the cathode compressor 34 to the fuel cell stack 1, and the volumes are replaced by the cathode gas.

In a case where the cathode compressor 34 is temporarily driven in this manner, the output voltage of the fuel cell stack 1 is increased to the open end voltage. Thus, in a case where the output voltage is estimated in accordance with the idle stop time, the idle stop time may be reset to zero at the time when the cathode compressor 34 is driven.

Further, in each of the embodiments described above, the certain amount of the anode gas is supplied during the idle stop. However, the supply of the anode gas may be stopped together with the cathode gas.

Furthermore, in each of the embodiments described above, a circulation system is adopted in which the anode off-gas is returned back to the anode gas supply passage 22. However, the system is not limited to such a system, and a so-called dead-end system, in which the anode off-gas is not returned to the anode gas supply passage 22, may be adopted.

The present application claims priority to Japanese Patent Application No. 2012-164626, filed with the Japan Patent Office on Jul. 25, 2012, the content of which is incorporated herein by reference in their entirety.

The invention claimed is:

1. A fuel cell system comprising:
a fuel cell to which an anode gas and a cathode gas are supplied to generate electric power; and
a controller programmed to:
stop extraction of a current from the fuel cell as an idle stop state in accordance with an operation state of the fuel cell system; and
restart the extraction of the current from the fuel cell in accordance with the operation state of the fuel cell system,
wherein the controller is programmed to limit the current to be extracted from the fuel cell after recovery from the idle stop state such that the higher the output voltage of the fuel cell detected before recovery from idle stop state is, the lower the current to be extracted from the fuel cell after the recovery from the idle stop state is.

2. The fuel cell system according to claim 1,
wherein the controller is programmed to make the current to be extracted from the fuel cell smaller as the output voltage of the fuel cell detected before the recovery from the idle stop state becomes higher.

3. The fuel cell system according to claim 1,
wherein the controller is programmed to limit the current to be extracted from the fuel cell in accordance with a current extraction profile set up so that the current to be extracted from the fuel cell is made smaller as the output voltage of the fuel cell detected before the recovery from the idle stop state becomes higher.

4. The fuel cell system according to claim 1,
wherein the controller is programmed to limit the current to be extracted from the fuel cell in such a manner that the output voltage of the fuel cell does not fall below a minimum operation voltage of a vehicle travelling motor that is driven by electric power of the fuel cell.

5. The fuel cell system according to claim 1,
wherein the controller is programmed to estimate the output voltage of the fuel cell before the recovery from the idle stop state on the basis of an elapsed time since supply of the cathode gas is stopped during the idle stop state.

6. The fuel cell system according to claim 5,
wherein the controller is programmed to correct the estimated output voltage of the fuel cell in accordance with a temperature of the fuel cell.

7. The fuel cell system according to claim 5,
wherein the controller is programmed to correct the estimated output voltage of the fuel cell in accordance with a humidity of the fuel cell.

8. The fuel cell system according to claim 1,
wherein the fuel cell system comprises a fuel cell stack that is configured by a plurality of the fuel cells, and
wherein the controller is programmed to limit the current to be extracted from the fuel cell on the basis of a voltage of the fuel cell that has the highest output voltage among the fuel cells configuring the fuel cell stack.

9. The fuel cell system according to claim 1, wherein system required power increases upon recovery from the idle stop state.

10. The fuel cell system according to claim 1, wherein the controller is further programmed to, in response to an increase of system required power, recover from the idle stop state and restart the extraction of the current from the fuel cell.

11. The fuel cell system according to claim 1, wherein the controller is further programmed to, in response to determining that system required power is greater than power for implementing the idle stop state, recover from the idle stop state and restart the extraction of the current from the fuel cell.

* * * * *